United States Patent [19]

Zanka et al.

[11] Patent Number: 5,424,339
[45] Date of Patent: Jun. 13, 1995

[54] METHOD FOR PRODUCING AN OPTICAL MATERIAL HAVING A HIGH REFRACTIVE INDEX

[75] Inventors: Yukihito Zanka; Tsutomu Isaka; Yutaka Tamura, all of Ami, Japan

[73] Assignee: Mitsubishi Petrochemical Company Limited, Tokyo, Japan

[21] Appl. No.: 177,387

[22] Filed: Jan. 5, 1994

Related U.S. Application Data

[62] Division of Ser. No. 37,393, Mar. 26, 1993, abandoned.

[30] Foreign Application Priority Data

Mar. 27, 1992 [JP] Japan .................... 4-71695

[51] Int. Cl.$^6$ ................... C08F 2/46; C08G 18/67
[52] U.S. Cl. ................... 522/168; 522/170; 522/174; 522/183; 526/289
[58] Field of Search ............... 522/173, 174, 170, 183, 522/168

[56] References Cited

U.S. PATENT DOCUMENTS

| | | | |
|---|---|---|---|
| 5,102,924 | 4/1992 | Williams | 522/174 |
| 5,136,008 | 8/1992 | Meixner | 528/49 |
| 5,214,116 | 5/1993 | Matsuoka | 526/286 |

Primary Examiner—Christopher Henderson
Attorney, Agent, or Firm—Oblon, Spivak, McClelland, Maier & Neustadt

[57] ABSTRACT

An optical material with a high refractive index comprising a resin which is obtainable by polymerization and curing of a composition comprising the following components (A), (B) and (C):

component (A): a sulfur-containing (meth)acrylic monomer represented by the following formula [I], or a mixture of the monomer [I] and a sulfur-containing (meth)acrylic monomer represented by the following formula [II]:

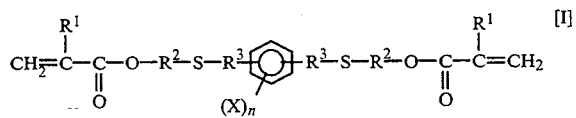

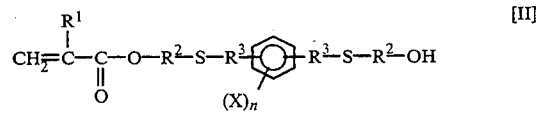

in each of which formulas, $R^1$ represents a hydrogen atom or a methyl group, $R^2$ and $R^3$ independently represent a hydrocarbyl group of 1 to 12 carbon atoms, X represents a halogen atom except fluorine, and n represents 0 or an integer of 1 to 4, provided that those groups which are in plurality may be the same or different, the weight ratio of the compound [I]/the compound [II] being from 10/0 to 1/9;

component (B): a hydroxy(meth)acrylic monomer represented by the following formula [III]:

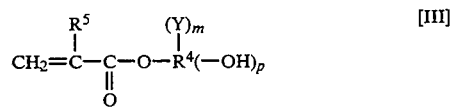

wherein $R^5$ represents a hydrogen atom or a methyl group, $R^4$ represents a hydrocarbyl group of 1 to 20 carbon atoms which may or may not contain an ether oxygen atom, Y represents a halogen atom except fluorine, and m represents 0 or an integer of 1 or 2, provided that those groups which are in plurality may be the same or different, and p is 1 or 2, the weight ratio of the component (A)/the component (B) being from 95/5 to 50/50; and component (C): an isocyanate compound having a plurality of —NCO groups, the ratio (—NCO/—OH) of the number of —NCO group in the component (C) to the total number of —OH group in the components (A) and (B) being from 0.2 to 3.

The above material for lenses has a low specific gravity and improved refractive index transparency and impact resistance.

11 Claims, No Drawings

METHOD FOR PRODUCING AN OPTICAL MATERIAL HAVING A HIGH REFRACTIVE INDEX

This is a division of application Ser. No. 08/037,393, filed on Mar. 26, 1993, now abandoned.

BACKGROUND OF THE INVENTION

1. Field of the Invention

The present invention relates to resins for plastic lenses, and more particularly to resins for lenses which have a high refractive index and have a high impact resistance.

2. Related Art

Heretofore, a diethyleneglycol bisarylcarbonate resin has been widely used as a resin for plastic lenses. This resin has excellent impact resistance and transparency, and, at the same time, has good light-dispersion properties. However, the refractive index of the resin is as low as 1.50, so that in order to obtain refraction comparable to that of a glass lens, a lens made of this resin is necessarily made thick.

On the other hand, it is known that a variety of diacrylates and dimethacrylates can be readily polymerized radically to produce lenses of excellent transparency. For instance, it is known that resins for lenses which can be obtained from di(meth)acrylate having a bromine-containing bisphenol A skeleton (Japanese Laid-Open Patent Publications Nos. 184210/1984 and 193915/1984) or di(meth)acrylate having a sulfur-containing aromatic skeleton (Japanese Laid-Open Patent Publications Nos. 26010/1985 and 195357/1987) have well-balanced optical properties with a high refractive index and a high Abbe number.

However, although the above compounds form a highly-crosslinked structure when polymerized radically and show the properties of high resistance to heat and abrasion, the cured polymers tend to be brittle. As a means for improving the above shortcoming, a method in which use is made of a bromine-containing bisphenol A derivative (meth)acrylated and urethanized is disclosed in Japanese Laid-Open Patent Publication No. 51706/1985. However, since a bromine atom is contained, the compound thus obtained has a high specific gravity. For this reason, it is inevitable that the compound has poor weather resistance.

SUMMARY OF THE INVENTION

An object of the present invention is to solve the foregoing problems thereby to provide resins for lenses which are light, have a high refractive index, and have excellent transparency and impact resistance.

An optical material with a high refractive index according to the present invention comprises a resin which is obtainable by polymerization and curing of a composition comprising the following components (A), (B) and (C), conducted by treating the composition with heat, an active energy ray, a radical generator to an ethylenic unsaturated bond, and/or a catalyst for urethanization reaction:

component (A): a sulfur-containing (meth)acrylic monomer represented by the following formula [I], or a mixture of the monomer [I] and a sulfur-containing (meth)acrylic monomer represented by the following formula [II]:

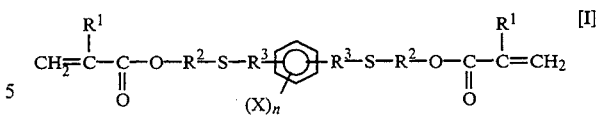

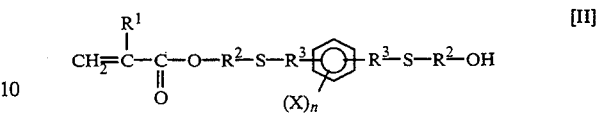

in each of which formulas; $R^1$ represents a hydrogen atom or a methyl group, $R^2$ and $R^3$ independently represent a hydrocarbyl group of 1 to 12 carbon atoms, X represents a halogen atom except fluorine, and n represents 0 or an integer of 1 to 4, provided that those groups which are in plurality may be the same or different, the weight ratio of the compound [I]/the compound [II] being from 10/0 to 1/9;

component (B): a hydroxy(meth)acrylic monomer represented by the following formula [III]:

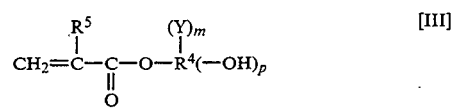

wherein $R^5$ represents a hydrogen atom or a methyl group, $R^4$ represents a hydrocarbyl group of 1 to 20 carbon atoms which may or may not contain an ether oxygen atom, Y represents a halogen atom except fluorine, m represents 0 or an integer of 1 or 2, provided that those groups which are in plurality may be the same or different, and p is 1 or 2, the weight ratio of the component (A)/the component (B) being from 95/5 to 60/40; and component (C): an isocyanate compound having a plurality of —NCO groups, the ratio (—NCO/—OH) of the number of —NCO group in the component (C) to the total number of —OH group in the components (A) and (B) being from 0.2 to 3.

Further disclosed is a method for producing an optical material with a high refractive index according to the present invention which comprises subjecting a composition comprising the following components (A), (B) and (C) in the presence of a radical polymerization initiator and a catalyst for urethanization reaction to irradiation with ultraviolet rays thereby to conduct radical polymerization, or radical polymerization in combination with urethanization reaction, and heating the composition thereby to complete the polymerization:

component (A): a sulfur-containing (meth)acrylic monomer represented by the following formula [I], or a mixture of the monomer [I] and a sulfur-containing (meth)acrylic monomer represented by the following formula [II ]:

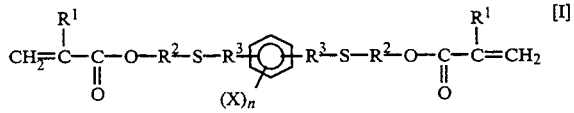

-continued

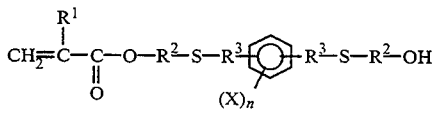 [II]

in each of which formulas, $R^1$ represents a hydrogen atom or a methyl group, $R^2$ and $R^3$ independently represent a hydrocarbyl group of 1 to 12 carbon atoms, X represents a halogen atom except fluorine, and n represents 0 or an integer of 1 to 4, provided that those groups which are in plurality may be the same or different, the weight ratio of the compound [I]/the compound [II] being from 10/0 to 1/9;

component (B): a hydroxy(meth)acrylic monomer represented by the following formula [III]:

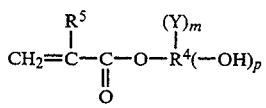 [III]

wherein $R^5$ represents a hydrogen atom or a methyl group, $R^4$ represents a hydrocarbyl group of 1 to 20 carbon atoms which may or may not contain an ether oxygen atom, Y represents a halogen atom except fluorine, m represents 0 or an integer of 1 or 2, provided that those groups which are in plurality may be the same or different, and p is 1 or 2, the weight ratio of the component (A)/the component (B) being from 95/5 to 60/40; and component (C): an isocyanate compound having a plurality of —NCO groups, the ratio (—NCO/—OH) of the number of —NCO group in the component (C) to the total number of —OH group in the components (A) and (B) being from 0.2 to 3.

According to the present invention, resins for lenses which are light, have a high refractive index and have excellent transparency and impact resistance can be obtained.

DETAILED DESCRIPTION OF THE INVENTION

[Optical Material with High Refractive Index]

The optical material with a high refractive index according to the present invention is obtainable by polymerization and curing of a composition comprising components (A), (B) and (C).

The word "comprising" herein means that the composition can contain a small amount of an auxiliary component (described later in detail) in addition to the enumerated components, that is, the components (A), (B) and (C), provided that it is not detrimental to the objects of the present invention.

<Component (A): Sulfur-Containing (Meth)acrylic Monomer>

Component (A) is sulfur-containing bis(meth)acrylate represented by formula [I], or a mixture of the compound [I] and sulfur-containing (meth)acrylate having a hydroxy end group represented by formula [II]:

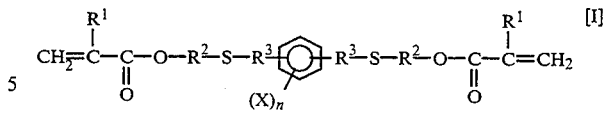 [I]

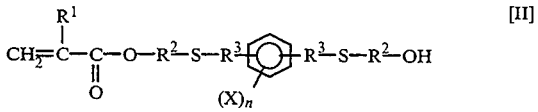 [II]

in each of which formulas, $R^1$ represents a hydrogen atom or a methyl group, $R^2$ and $R^3$ independently represent a hydrocarbyl group having 1 to 12 carbon atoms, X represents a halogen atom except fluorine, and n represents 0 or an integer of 1 to 4, provided that those groups which are in plurality such as $R^1$, $R^2$, $R^3$ and X may be the same or different.

The weight ratio of the compound [I]/the compound [II] is from 10/0 to 1/9.

It is to be noted that "(meth)acrylic" and "(meth)acrylate" are general terms for acrylic and methacrylic, and acrylate and methacrylate, respectively. $R^2$ and $R^3$ are each preferably $C_1$ to $C_4$, and more preferably $C_2$–$C_3$ for $R^2$ and $C_1$ for $R^3$.

Specific examples of the sulfur-containing bis(meth)acrylate compound represented by the formula [I] include p-bis(β-methacryloyloxyethylthio)xylylene, p-bis(β-acryloyloxyethylthio)xylylene, m-bis(β-methacryloyloxyethylthio)xylylene, m-bis(β-acryloyloxyethylthio)xylylene and p-bis(β-methacryloyloxyethylthio)tetrabromoxylylene.

These compounds may be synthesized, for example, by a method described in Japanese Laid-Open Publication No. 195357/1987.

The monomers of formulae [I] and [II] respectively have a structure of bis(methacrylate) of an ω-dihydroxyl compound of HO—$R^2$—S—$R^3$-phenylene-$R^3$—S—$R^2$—OH, and it is preferable that the component (A) is a mixture of the two monomers of formulae [I] and [II].

Specific examples of the sulfur-containing (meth)acrylate compounds having a terminal hydroxy group represented by the formula [II] include the compound represented by the following formula and its ortho and meta isomers:

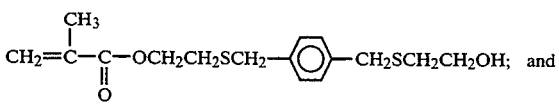

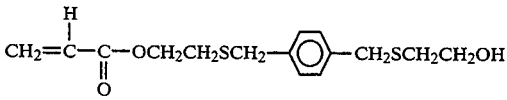

It is undesirable that the ratio of the compound [II] to the compound [I] be in excess of 90/10, because, in this case, the cured polymer obtained may undergo deterioration in the physical properties such as impact resistance.

<Compound (B)>

Compound (B) is (meth)acrylate having a terminal hydroxy group represented by the following formula [III]:

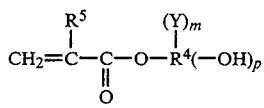

$$\text{CH}_2=\overset{R^5}{\underset{\underset{O}{\|}}{C}}-\overset{(Y)_m}{\underset{}{C}}-O-R^4(-OH)_p \quad [\text{III}]$$

wherein $R^5$ represents a hydrogen atom or a methyl group, $R^4$ represents a hydrocarbyl group which has 1 to 20 carbon atoms and may or may not contain an ether oxygen atom, Y represents a halogen atom except fluorine, m represents 0 or an integer of 1 or 2, provided that those groups which are in plurality such as Y may be the same or different, and p is 1 or 2. $R^4$ is preferably a group obtained from a lower alkylene oxide such as ethylene or propylene oxide and its oligomer or from glycerol.

Specific examples of the hydroxy(meth)acrylate compounds represented by the formula [III] include (poly)ethyleneglycol (meth)acrylates, (poly)propyleneglycol (meth)acrylates and glycerol methacrylates, such as hydroxyethyl methacrylate, hydroxyethyl acrylate, hydroxypropyl methacrylate, hydroxypropyl acrylate, 2-hydroxy-3-phenoxypropyl methacrylate, 2-hydroxy-3-phenoxypropyl acrylate, 5-hydroxyhexanonyloxyethyl methacrylate (caprolactone modified 2-hydroxyethyl methacrylate), 5-hydroxyhexanonyloxyethyl acrylate (caprolactone modified 2-hydroxyacrylate), glycerol methacrylate, 3-chloro-2-hydroxypropyl methacrylate, 3-chloro-2-hydroxypropyl acrylate, 2-hydroxyethoxyethyl methacrylate and 2-hydroxyethoxyethyl acrylate.

Of the above compounds, (poly)ethylene glycol (meth)acrylates and (poly)propylene glycol (meth)acrylates, such as 2-hydroxyethyl methacrylate, 2-hydroxyethyl acrylate, 2-hydroxyethoxyethyl methacrylate and 2-hydroxyethoxyethyl acrylate are particularly preferred.

<Compound (C)>

Examples of multifunctional isocyanate which can urethanize the above compounds, that is, isocyanate having a plurality of —NCO groups, include o-xylylene diisocyanate, m-xylylene diisocyanate, p-xylylene diisocyanate, isophorone diisocyanate, triisocyanurate, tolylene diisocyanate and their nucleus-hydrogenated products, and hexamethylene diisocyanate.

Of these isocyanate compounds, m-xylylene diisocyanate is particularly preferred.

<Composition>

The proportion of the component (A) to the component (B) is as follows:

(A)/(B)=(95 parts by weight)/(5 parts by weight) to (60 parts by weight)/(40 parts by weight), preferably (90 parts by weight)/(10 parts by weight) to (70 parts by weight)/(30 parts by weight).

When the weight ratio of the component (A) to the component (B) is in excess of 95/5, there is almost no effect of improving the physical properties such as the impact resistance of the cured product. On the other hand, when the weight ratio is less than 60/40, the cured product has a low refractive index, so that it loses its meaning as a material for lenses with a high refractive index.

The amount of the multifunctional isocyanate, component (C), which is added to a mixture of the above-described components (A) and (B) to cause urethanization is shown below as the ratio of the number of —NCO group contained in the multifunctional isocyanate to that of —OH group contained in the mixture.

—NCO/—OH=0.2 to 3, preferably 0.5 to 1.5

When the ratio of the number of —NCO group to that of —OH group is in excess of 3, the heat resistance of the cured product may deteriorate, and when it is less than 0.2, the flexural property of the cured product may deteriorate. When the heat resistance is low, a film applied on the lens produced from the resin tends to crack. When the flexural properties are poor, the center thickness of the lens produced from the resin may not be made thin.

<Auxiliary Component>

As mentioned previously, the resin or optical material with a high refractive index according to the present invention is obtained by polymerization and curing of a composition comprising the components (A), (B) and (C), and the composition may upon necessity contain a small amount of an auxiliary component. Therefore, it is also possible to prepare a resin for lenses of the present invention by mixing a relatively small amount of another radically polymerizable monomer with the composition before curing, and copolymerizing the mixture. Examples of monomers which can be used for the above copolymerization include nucleus- and/or side chain-substituted or non-substituted styrene such as styrene, chlorostyrene, dichlorostyrene, bromostyrene, dibromostyrene, divinylbenzene and α-methylstyrene; phenyl (meth)acrylate, phenoxyethyl (meth)acrylate and substitution products thereof which are substituted with halogen other than fluorine; and (meth)acrylate compounds such as trimethylolpropane tri(meth)acrylate, 2,2-bis[4(β-methacryloyloxyethoxy)phenyl]propane, 2,2-bis[4(β-acryloyloxyethoxy)phenyl]propane and triethylene glycol di(meth)acrylate. Of these monomers, styrene, chlorostyrene, dibromostyrene, divinylbenzene, 4,4'-bis(methacryloyloxyethoxy)diphenylpropane, and a mixture thereof are particularly preferred.

Beside the monomers to be copolymerized referred to above, an antioxidant, an ultraviolet absorber, a dye and pigment, a filler and the like may be mentioned as auxiliary components which can be used in the present invention.

<Polymerization and Curing>

The optical material with a high refractive index according to the present invention comprises a resin which is obtained by polymerization and curing of the composition comprising the components (A), (B) and (C), conducted by treating the composition with heat, an active energy ray, a radical initiator to an ethylenic unsaturated bond, and/or a catalyst for urethanization reaction.

No particular limitation is imposed on the manner of excitation and the intensity of application thereof to the composition as long as a predetermined cured polymer can be obtained. However, from the viewpoints of operation and higher productivity of the cured product, a preferable method is such that the composition comprising the components (A), (B) and (C) in the presence of a radical polymerization initiator and a catalyst for urethanization reaction is irradiated with ultraviolet rays to cause radical polymerization, or radical polymerization and urethanization reaction, followed by heating to complete the polymerization or curing.

Any amount or intensity of an ultraviolet ray can be applied as long as a photopolymerization initiator used can generate radicals. However, when the amount of an ultraviolet ray is extremely small, the effect of photopolymerization may not be obtained. On the other hand, when the amount of an ultraviolet ray is extremely excessive, the polymer may deteriorate due to the light. It is therefore preferable to select a proper ultraviolet ray from those having a wavelength of 320 nm to 390 nm and a total energy of 0.01 J to 300 J, depending on the monomer composition and the type of additive, such as the type of the photopolymerization initiator used. Specific examples of lamps which can be used include a metal halide lamp and a high-voltage mercury vapor lamp.

The temperature and the time for thermal polymerization which is conducted after the irradiation of an ultraviolet ray vary depending upon the type or amount of a thermal polymerization initiator and a catalyst for urethanization reaction which are added to the system. They are selected so that a lens having the desired physical properties can be obtained. In general, a lens produced by excessive heating is readily yellowed, and the composition becomes unstable in the course of handling when a catalyst which is extremely active at a low temperature is used. For these reasons, the thermal polymerization is usually carried out at a temperature of 40° C. to 150° C. for 0.05 to 10 hours.

The thermal polymerization herein also includes polymerization caused by heat which is applied in the course of the post-treatment process of a molded lens, such as coating.

By adopting the above method, the polymerization time can be greatly shortened as compared with the case in which only thermal polymerization is conducted. In addition, the problem of thickening, or, in some cases, separation which is caused when a compound that has been urethanized in advance is mixed with the compound represented by the formula [I] can be solved, so that both productivity and operation efficiency are improved. In general, in the case where copolymerization is conducted with urethane acrylate in order to improve the physical properties, it is inevitable that thickening takes place upon mixing. For this reason, it is desirable to adopt the above-described method, especially for the production of a lens in which a casting process is involved.

Examples of the photopolymerization initiator include acylphosphine oxides and acylphosphinate esters such as 2,6-dimethylbenzoyldiphenylphosphine oxide, 2,4,6-trimethylbenzoyldiphenylphosphine oxide, methyl 2,4,6-trimethylbenzoylphenylphosphinate, 2,6-dichlorobenzoyldiphenylphosphine oxide and 2,6-dimethoxybenzoyldiphenylphosphine oxide; acetophenone compounds such as 1-phenyl-2-hydroxy-2-methylpropane-1-one, 1-hydroxycyclohexylphenylketone, 4-diphenoxydichloroacetophenone, diethoxyacetophenone and 1-(4-isopropylphenyl)-2-hydroxy-2-methylpropane-1-one; and benzophenone compounds such as benzophenone, methyl benzoylbenzoate, 4-phenylbenzophenone, hydroxybenzophenone, 3,3'-dimethyl-4-methoxybenzophenone and diphenoxybenzophenone.

Of the above photopolymerization initiators, 2,4,6-trimethylbenzoyldiphenylphosphine oxide, methyl trimethylbenzoylphenylphosphinate, 1-hydroxycyclohexylphenylketone, benzophenone and diphenoxybenzophenone are preferred.

The proportion of the photopolymerization initiator is approximately from 0.01 to 0.3 parts by weight, preferably from 0.02 to 0.2 parts by weight, per 100 parts by weight of the diethylenically unsaturated monomer used. When the incorporation amount of the photopolymerization initiator is too large, not only does the internal homogeneity of the cured resin become poor, but also the hue of the resin becomes poor. On the other hand, when the amount of the photopolymerization initiator is too small, the composition cannot be fully cured.

Although the use of a thermal polymerization initiator is not essential, it is desirable to add the initiator in order to complete the polymerization more thoroughly. The amount of the initiator used is 5 parts by weight or less per 100 parts by weight of the composition. It is undesirable to use the initiator excessively because the cured product is adversely affected; for example, the hue of the cured product becomes poor. Specific examples of the thermal polymerization initiator include benzoyl peroxide, diisopropyl peroxycarbonate, lauroyl peroxide, t-butylperoxy(2-ethylhexanoate) and azobisisobutyronitrile. Any initiator which is ordinarily used for thermal polymerization of (meth)acrylates can be used. In general, these initiators belong to the category of radical initiator to an ethylenic unsaturated bond.

On the other hand, any known catalyst can be used as the catalyst for urethanization reaction. Specific examples of the catalyst include metal compounds such as dibutyltin dilaurate and aluminum triisopropoxide, and Lewis bases such as tertiary amine and tertiary phosphine.

The amount of the catalyst used is approximately from 10 to 10,000 ppm, preferably from 100 to 1,000 ppm, of the amount of the composition comprising the components (A), (B) and (C). When more than 10,000 ppm of the catalyst for urethanization reaction is used, the composition comprising the components (A)–(C) thickens when it is urethanized, so that casting of the composition becomes difficult. On the other hand, when the amount of the catalyst is less than 10 ppm, the polymerization may not be completed, resulting in deterioration in the physical properties of the final product.

As mentioned previously, it is possible to conduct curing after adding some auxiliary components such as an antioxidant, an ultraviolet absorber and a colorant to the composition before curing. Further, in the present invention, it is also possible to subject the cured resin, especially the one molded into the form of a lens, to a surface treatment such as hard coating or reflection preventing coating.

EXAMPLES

The following examples are presented to illustrate the present invention more specifically. Throughout the examples, "parts" means "parts by weight". The properties of the cured products obtained in the examples were determined in accordance with the following test methods.

(1) Appearance: Observed visually.
(2) Refractive index: Measured by an Abbe's refractometer (manufactured by Atago Co., Ltd., Japan) at a temperature of 25° C.
(3) Optical distortion: Checked on the cured product obtained by using a lens mold, by a distortion checking machine (manufactured by Toshiba Glass Co., Ltd., Japan). Indicated by "" when no optical distortion was found, and by "×" when optical distortion was found.
(4) Impact resistance: Examined, in accordance with the FDA standard, by dropping a rigid ball (weight: 16.3 g, diameter: 15.9 mm) on a flat board with a thickness of 2 mm from a height of 127 cm.

Indicated by "" when the board was not damaged, and by "×" when the board was damaged. Measurement temperature: 25° C.

(5) Flexural modulus: Determined on a board with a width of 1 cm and a thickness of 2 mm by an autograph with the distance between the supports adjusted to 3 cm. Measurement temperature: 25° C.

(6) Heat resistance: Determined by the Vicat indentation test. Indicated by "×" when an indenter penetrated to 0.3 mm or more at a temperature of 50° C. or lower, and by "" when an indenter did not penetrate to 0.3 mm at the temperature.

Sectional area of indenter: 1.0 mm²; load: 5 kg; rate of temperature rise: 50° C./hr.

Example 1

63.5 parts of p-bis($\beta$-methacryloyloxyethylthio)xylylene, 21.2 parts of hydroxyethyl methacrylate, 15.3 parts of m-xylylene diisocyanate, and, as a polymerization initiator and a polymerization catalyst, 0.05 parts of 2,4,6-trimethylbenzoyldiphenylphosphine oxide ("Lucirin T.P.O." (Trademark) manufactured by BASF Corp.), 0.3 parts of t-butylperoxy-2-ethylhexanoate ("Perbutyl O") (Trademark) manufactured by Nippon Oils & Fats Co., Ltd., Japan) and 0.001 parts of dibutyltin dilaurate were homogeneously mixed by stirring, and the resulting mixture was subjected to defoaming, whereby a composition was obtained.

The composition thus obtained was cast in a mold with a depth of 2 mm, composed of a glass plate with mirror finish and a gasket made from an ethylene-vinyl acetate copolymer. While passing the mold placed on a conveyer between metal halide lamps having an output power of 80 W/cm, which were set at the upper and lower sides of the conveyer each at a distance of 40 cm from the glass surface, the composition was irradiated with ultraviolet rays for 10 minutes. The composition was then subjected to thermal polymerization in an oven at a temperature of 80° C. for 2 hours and at 100° C. for 2 hours. Thereafter, the composition was taken out from the mold, thereby obtaining a colorless, transparent cured product. The results of the measurement of the physical properties of the product were as shown in Table 1. Further, the composition after being subjected to defoaming was cast in a minus lens mold with a diameter of 80 mm and a center thickness of 1.3 mm, composed of a glass plate and a gasket made from an ethylene-vinyl acetate copolymer. After the composition was irradiated with ultraviolet rays in the same manner as described above, the composition was subjected to thermal polymerization and then taken out from the mold to obtain a colorless, transparent lens. The optical distortion of this lens was as shown in Table 1.

Example 2

The procedure of Example 1 was repeated except that 62.4 parts of p-bis($\beta$-methacryloyloxyethylthio)xylylene, 20.8 parts of hydroxyethyl methacrylate and 16.8 parts of m-xylylene diisocyanate were used, thereby obtaining a cured product. The results of the measurement of the physical properties of the product and the optical distortion of the lens were as shown in Table 1.

Example 3

The procedure of Example 1 was repeated except that 66.3 parts of p-bis($\beta$-methacryloyloxyethylthio)xylylene, 22.0 parts of 3-chloro-2-hydroxypropyl methacrylate ("TOPOLENE M" (Trademark) manufactured by Shin-Nakamura Chemical Co., Ltd.) and 11.6 parts of m-xylylene diisocyanate were used, thereby obtaining a cured product. The results of the measurement of the physical properties of the product and the optical distortion of the lens were as shown in Table 1.

Example 4

The procedure of Example 1 was repeated except that 66.1 parts of p-bis($\beta$-methacryloyloxyethylthio)xylylene, 22.0 parts of polyethylene glycol 90 methacrylate ("BLEMMER PE90" (Trademark) manufactured by Nippon Oil & Fats Co., Ltd.) and 11.9 parts of m-xylylene diisocyanate were used, thereby obtaining a cured product. The results of the measurement of the physical properties of the product and the optical distortion of the lens were as shown in Table 1.

Example 5

The procedure of Example 1 was repeated except that 67.8 parts of p-bis($\beta$-methacryloyloxyethylthio)xylylene, 22.6 parts of polyethylene glycol 200 methacrylate ("BLEMMER PE200" (Trademark) manufactured by Nippon Oil & Fats Co., Ltd.) and 9.6 parts of m-xylylene diisocyanate were used, thereby obtaining a cured product. The results of the measurement of the physical properties of the product and the optical distortion of the lens were as shown in Table 1.

Example 6

The procedure of Example 1 was repeated except that 47.6 parts of p-bis($\beta$-methacryloyloxyethylthio)xylylene, 15.9 parts of hydroxyethyl methacrylate, 11.5 parts of m-xylylene diisocyanate and 25 parts of styrene were used, thereby obtaining a cured product. The results of the measurement of the physical properties of the product and the optical distortion of the lens were as shown in Table 1.

Example 7

The procedure of Example 1 was repeated except that 55.1 parts of p-bis($\beta$-methacryloyloxyethylthio)xylylene, 18.4 parts of hydroxyethyl methacrylate and 26.5 parts of m-xylylene diisocyanate were used, thereby obtaining a cured product. The results of the measurement of the physical properties of the product and the optical distortion of the lens were as shown in Table 1.

Comparative Example 1

The procedure of Example 1 was repeated except that 100 parts of p-bis($\beta$-methacryloyloxyethylthio)xylylene, and, as polymerization initiators, 0.05 parts of "Lucirin T.P.O." (Trademark) and 0.3 parts of "Perbutyl O" (Trademark) were used, thereby obtaining a cured product. The results of the measurement of the physical properties of the product and the optical distortion of the lens were as shown in Table 1.

Comparative Example 2

The procedure of Example 1 was repeated except that 75 parts of p-bis($\beta$-methacryloyloxyethylthio)xylene and 25 parts of hydroxyethyl acrylate were used, thereby obtaining a cured product. The results of the measurement of the physical properties of the product and the optical distortion of the lens were as shown in Table 1.

TABLE 1

|  | Monomer Composition | —NCO/—OH Ratio | Appearance | Refractive index | Impact resistance | Flexural modulus (Kg · mm$^{-2}$) | Specific gravity |
|---|---|---|---|---|---|---|---|
| Example 1 | TEMA/HEMA/m-XDI | 63.5/21.2/15.3 | 1 | Colorless, transparent | 1.58 | ○ | 340 | 1.27 |
| Example 2 | TEMA/HEA/m-XDI | 62.4/20.8/16.8 | 1 | Colorless, transparent | 1.58 | ○ | 350 | 1.27 |
| Example 3 | TEMA/"TOPOLENE M"/m-XDI | 66.3/22.0/11.6 | 1 | Colorless, transparent | 1.59 | ○ | 350 | 1.28 |
| Example 4 | TEMA/PE-90/m-XDI | 66.1/22.0/11.9 | 1 | Colorless, transparent | 1.58 | ○ | 330 | 1.26 |
| Example 5 | TEMA/PE-200/m-XDI | 67.8/22.6/9.6 | 1 | Colorless, transparent | 1.59 | ○ | 3 50 | 1.27 |
| Example 6 | TEMA/HEMA/m-XDI/St | 47.6/15.9/11.5/25 | 1 | Colorless, transparent | 1.59 | ○ | 310 | 1.25 |
| Example 7 | TEMA/HEMA/m-XDI | 55.1/18.4/26.5 | 2 | Colorless, transparent | 1.58 | ○ | 360 | 1.29 |
| Comparative Example 1 | TEMA | 100 | — | Colorless, transparent | 1.60 | × | 280 | 1.24 |
| Comparative Example 2 | TEMA/HEMA | 75/25 | — | Colorless, transparent | 1.57 | 602 | 240 | — |

Example 8

15.3 parts of p-bis(β-methacryloyloxyethylthio)xylylene, 45.8 parts of 2-[p-(2-hydroxyethylthiomethyl)-phenylmethylthio]ethyl methacrylate, 4 parts of hydroxyethyl acrylate, 24.4 parts of m-xylylene diisocyanate, and, as a polymerization initiator and a polymerization catalyst, 0.05 parts of 2,4,6-trimethylbenzoyldiphenylphosphine oxide ("Lucirin T.P.O." (Trademark) manufactured by BASF Corp.), 0.3 parts of t-butylperoxy-2-ethylhexanoate ("Perbutyl O" (Trademark) manufactured by Nippon Oils & Fats Co., Ltd.) and 0.001 parts of dibutyltin dilaurate were homogeneously mixed by stirring, and the resulting mixture was subjected to defoaming, whereby a composition was obtained.

The composition thus obtained was cast in-a mold with a depth of 2 mm, composed of a glass plate with mirror finish and a gasket made from an ethylene-vinyl acetate copolymer. While passing the mold placed on a conveyer between metal halide lamps having an output power of 80 W/cm, which were set at the upper and lower sides of the conveyer each at a distance of 40 cm from the glass surface, the composition was irradiated for 10 minutes with ultraviolet rays. The composition was then subjected to thermal polymerization in an oven at a temperature of 80° C. for 2 hours and at 100° C. for 2 hours. Thereafter, the composition was taken out from the mold, thereby obtaining a colorless, transparent cured product. The results of the measurement of the physical properties of the product were as shown in Table 2. Further, the composition after being subjected to defoaming was cast in a minus lens mold with a diameter of 80 mm and a center thickness of 1.3 mm, composed of a glass plate and a gasket made from an ethylene-vinyl acetate copolymer. After the composition was irradiated with ultraviolet rays in the same manner as described above, the composition was subjected to thermal polymerization, and then taken out from the mold to obtain a colorless, transparent lens. The optical distortion of this lens was as shown in Table 2.

Example 9

The procedure of Example 8 was repeated except that 56.6 parts of p-bis(β-methacryloyloxyethylthio)xylylene, 14.1 parts of 2-[p-(2-hydroxyethylthiomethyl)-phenylmethylthio]ethyl methacrylate, 14.5 parts of hydroxyethyl acrylate and 14.8 parts of m-xylylene diisocyanate were used, thereby obtaining a cured product. The results of the measurement of the physical properties of the product and the optical distortion of the lens were as shown in Table 2.

Example 10

The procedure of Example 8 was repeated except that 40.1 parts of p-bis(β-methacryloyloxyethylthio)xylylene, 26.8 parts of 2-[p-(2-hydroxyethylthiomethyl)-phenylmethylthio]ethyl methacrylate, 14.5 parts of hydroxyethyl acrylate and 18.6 parts of m-xylylene diisocyanate were used, thereby obtaining a cured product. The results of the measurement of the physical properties of the product and the optical distortion of the lens were as shown in Table 2.

Example 11

The procedure of Example 8 was repeated except that 40.1 parts of p-bis(β-methacryloyloxyethylthio)xylylene, 26.8 parts of 2-[p-(2-hydroxyethylthiomethyl)-phenylmethylthio]ethyl methacrylate, 13.2 parts of hydroxyethyl acrylate and 19.9 parts of m-xylylene diisocyanate were used, thereby obtaining a cured product. The results of the measurement of the physical properties of the product and the optical distortion of the lens were as shown in Table 2.

Example 12

The procedure of Example 8 was repeated except that 40.1 parts of p-bis(β-methacryloyloxyethylthio)xylylene, 26.8 parts of 2-[p-(2-hydroxyethylthiomethyl)-phenylmethylthio]ethyl methacrylate, 16.4 parts of 3-chloro-2-hydroxypropyl methacrylate ("TOPOLENE M" (Trademark) manufactured by Shin-Nakamura Chemical Co., Ltd.) and 16.7 parts of m-xylylene diisocyanate were used, thereby obtaining a cured product. The results of the measurement of the physical properties of the product and the optical distortion of the lens were as shown in Table 2.

Example 13

The procedure of Example 8 was repeated except that 40.1 parts of p-bis(β-methacryloyloxyethylthio)xylylene, 26.8 parts of 2-[p-(2-hydroxyethylthiomethyl)-phenylmethylthio]ethyl methacrylate, 16.2 parts of polyethylene glycol 90 methacrylate ("BLEMMER PE90" (Trademark) manufactured by Nippon Oils & Fats Co., Ltd.) and 16.9 parts of m-xylene diisocyanate were used, thereby obtaining a cured product. The results of the measurement of the physical properties of the product and the optical distortion of the lens were as shown in Table 2.

Comparative Example 4

The procedure of Example 8 was repeated except that 49.3 parts of p-bis($\beta$-methacryloyloxyethylthio)xylylene, 32.9 parts of 2-[p-(2-hydroxyethylthiomethyl)-phenylmethylthio]ethyl methacrylate and 17.8 parts of hydroxyethyl acrylate were used, thereby obtaining a cured product. The results of the measurement of the physical properties of the product and the optical distortion of the lens were as shown in Table 2.

TABLE 2

| | Monomer Composition | | | | | —NCO —OH Ratio | Appearacne | Refractive index | Optical distortion | Impact resistance | Flexural modulus (Kg · mm$^{-2}$) | Heat resistance |
|---|---|---|---|---|---|---|---|---|---|---|---|---|
| | TEMA | TEMA—OH | m-XDI | HEMA and others | | | | | | | | |
| Example 8 | 15.3 | 45.8 | 24.4 | HEMA | 14.5 | 1 | Colorless, transparent | 1.60 | ○ | ○ | 360 | ○ |
| Example 9 | 56.6 | 14.1 | 14.8 | HEMA | 14.5 | 1 | 1.59 transparent | ○ | ○ | 360 | ○ | |
| Example 10 | 40.1 | 26.8 | 18.6 | HEMA | 14.5 | 1 | 1.59 transparent | ○ | ○ | 340 | ○ | |
| Example 11 | 40.1 | 26.8 | 19.9 | HEA | 13.2 | 1 | 1.59 transparent | ○ | ○ | 330 | ○ | |
| Example 12 | 40.1 | 26.8 | 16.7 | "Trepon M" | 16.4 | 1 | 1.59 transparent | ○ | ○ | 350 | ○ | |
| Example 13 | 40.1 | 26.8 | 16.9 | PE90 | 16.2 | 1 | 1.59 transparent | ○ | ○ | 330 | ○ | |
| Example 14 | 40.1 | 26.8 | 14.7 | PE200 | 18.4 | 1 | 1.59 transparent | ○ | ○ | 280 | ○ | |
| Example 15 | 33.8 | 22.6 | 31.4 | HEMA | 12.2 | 1.5 | 1.59 transparent | ○ | ○ | 350 | ○ | |
| Comparative Example 3 | 20.4 | 61.1 | 18.5 | — | | 1 | transparent | 1.61 | ○ | ○ | 370 | × |
| Comparative Example 4 | 49.3 | 32.9 | — | HEMA | 17.8 | — | " transparent | 1.58 | ○ | × | 200 | × |

Example 14

The procedure of Example 8 was repeated except that 40.1 parts of p-bis($\beta$-methacryloyloxyethylthio)xylylene, 26.8 parts of 2-[p-(2-hydroxyethylthiomethyl)-phenylmethylthio]ethyl methacrylate, 18.4 parts of polyethylene glycol 200 methacrylate ("BLEMMER PE200" (Trademark) manufactured by Nippon Oils & Fats Co., Ltd. ) and 14.7 parts of m-xylylene diisocyanate were used, thereby obtaining a cured product. The results of the measurement of the physical properties of the product and the optical distortion of the lens were as shown in Table 2.

Example 15

The procedure of Example 8 was repeated except that 33.8 parts of p-bis($\beta$-methacryloyloxyethylthio)xylylene, 22.6 parts of 2-[p-(2-hydroxyethylthiomethyl)-phenyl]methylthioethyl methacrylate, 12.2 parts of hydroxyethyl methacrylate and 31.4 parts of m-xylylene diisocyanate were used, thereby obtaining a cured product. The results of the measurement of the physical properties of the product and the optical distortion of the lens were as shown in Table 2.

Comparative Example 3

The procedure of Example 8 was repeated except that 20.4 parts of p-bis($\beta$-methacryloyloxyethylthio)xylylene, 61.1 parts of 2-[p-(2-hydroxyethylthiomethyl)-phenylmethylthio]ethyl methacrylate and 18.5 parts of m-xylylene diisocyanate were used, thereby obtaining a cured product. The results of the measurement of the physical properties of the product and the optical distortion of the lens were as shown in Table 2.

What is claimed is:

1. A method for producing an optical material having a high refractive index, which comprises:
   irradiating a composition comprising the following components (A), (B) and (C), a radical polymerization initiator and a urethanization catalyst with ultraviolet radiation thereby causing the curing of the composition by a radical polymerization of unsaturated groups in reactants (A) and (B) and by the urethanization reaction of reactants (A) and (B) with isocyanate reactant (C); and
   heating the irradiating composition to complete curing:
   component (A): a sulfur-containing (meth)acrylic monomer represented by the following formula [I], or a mixture of the monomer [I] and a sulfur-containing (meth)acrylic monomer represented by the following formula [II]:

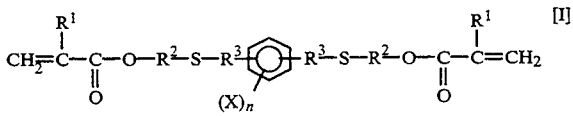

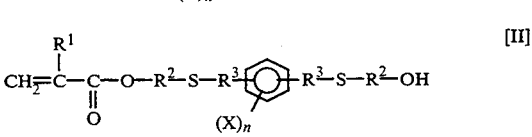

in each of which formulas, R$^1$ represents a hydrogen atom or a methyl group, R$^2$ and R$^3$ independently represent a hydrocarbyl group of 1 to 12 carbon atoms, X represents a halogen atom except fluorine, and n represents 0 or an integer of 1 to 4, provided that those groups which are in plurality may be the same or different,
the weight ratio of the compound [I]/the compound [II] being from 10/0 to 1/9;
component (B): a hydroxy(meth)acrylic monomer represented by the following formula [III]:

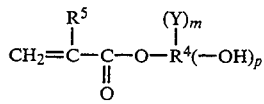

wherein $R^5$ represents a hydrogen atom or a methyl group, $R^4$ represents a hydrocarbyl group of 1 to 20 carbon atoms which may or may not contain an ether oxygen atom, Y represents a halogen atom except fluorine, m represents 0 or an integer of 1 or 2, provided that those groups which are in plurality may be the same or different, and p is 1 or 2,
the weight ratio of the component (A)/the component (B) being from 95/5 to 60/40; and
component (C): an isocyanate compound having a plurality of —NCO groups,
the ratio (—NCO/—OH) of the number of —NCO group in the component (C) to the total number of —OH group in the components (A) and (B) being from 0.2 to 3.

2. The method of producing an optical material with a high refractive index as claimed in claim 1, wherein both the monomers of the formulae [I] and [II] are used.

3. The method of producing an optical material with a high refractive index as claimed in claim 1, wherein $R^2$ and $R^3$ of the monomer of formula [I] are each $C_1$ to $C_4$.

4. The method of producing an optical material with a high refractive index as claimed in claim 1, wherein the monomer of formula [I] is selected from the group consisting of p-bis($\beta$-methacryloyloxyethylthio)xylylene, p-bis($\beta$-acryloyloxyethylthio)xylylene, m-bis($\beta$-methacryloyloxyethylthio)xylylene, m-bis($\beta$-acryloyloxyethylthio)xylylene and p-bis($\beta$-methacryloyloxyethylthio)tetrabromoxylylene.

5. The method of producing an optical material with a high refractive index as claimed in claim 1, wherein $R^2$ and $R^3$ of the monomer of formula [II] are each $C_1$ to $C_4$.

6. The method of producing an optical material with a high refractive index as claimed in claim 1, wherein the monomer of formula [II] is selected from the group consisting of

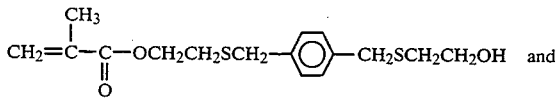

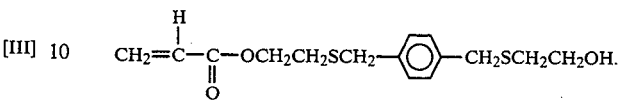

7. The method of producing an optical material with a high refractive index as claimed in claim 1, wherein the monomer of formula [III] is selected from the group consisting of (poly)ethylene glycol (meth)acrylates, (poly)propylene glycol (meth)acrylates and glycerol methacrylates.

8. The method of producing an optical material with a high refractive index as claimed in claim 7, wherein the monomer is selected from the group consisting of 2-hydroxyethyl methacrylate, 2-hydroxyethyl acrylate, 2-hydroxypropyl methacrylate, 2-hydroxypropyl acrylate, 2-hydroxyethoxyethyl methacrylate, 2-hydroxyethoxyethyl acrylate, 2-hydroxy-3-phenoxypropyl methacrylate, 2-hydroxy-3-phenoxypropyl acrylate, 5-hydroxyhexanonyloxyethyl methacrylate (caprolactone modified 2-hydroxyethyl methacrylate), 5-hydroxyhexanonyloxyethyl acrylate (caprolactone modified 2-hydroxyacrylate), glycerol methacrylate, 3-chloro-2-hydroxypropyl methacrylate, 3-chloro-2-hydroxypropyl acrylate, 2-hydroxyethoxyethyl methacrylate and 2-hydroxyethoxyethyl acrylate.

9. The method of producing an optical material with a high refractive index as claimed in claim 8, wherein the monomer is selected from the group consisting of 2-hydroxyethyl methacrylate, 2-hydroxyethyl acrylate, 2-hydroxyethoxyethyl methacrylate and 2-hydroxyethoxyethyl acrylate.

10. The method of producing an optical material with a high refractive index as claimed in claim 1, wherein the isocyanate compound having a plurality of —NCO groups is selected from the group consisting of o-xylylene diisocyanate, m-xylylene diisocyanate, p-xylylene diisocyanate, isophorone diisocyanate, triisocyanurate, tolylene diisocyanate, 1,2-(diisocyanatomethyl)cyclohexane, 1,3-(diisocyanatomethyl)cyclohexane, 1,4-(diisocyanatomethyl)cyclohexane, diisocyanato(methyl cyclohexane), and hexamethylene diisocyanate.

11. The method of producing an optical material with a high refractive index as claimed in claim 10, wherein the isocyanate is m-xylylene diisocyanate.

* * * * *